United States Patent Office 3,093,395
Patented June 11, 1963

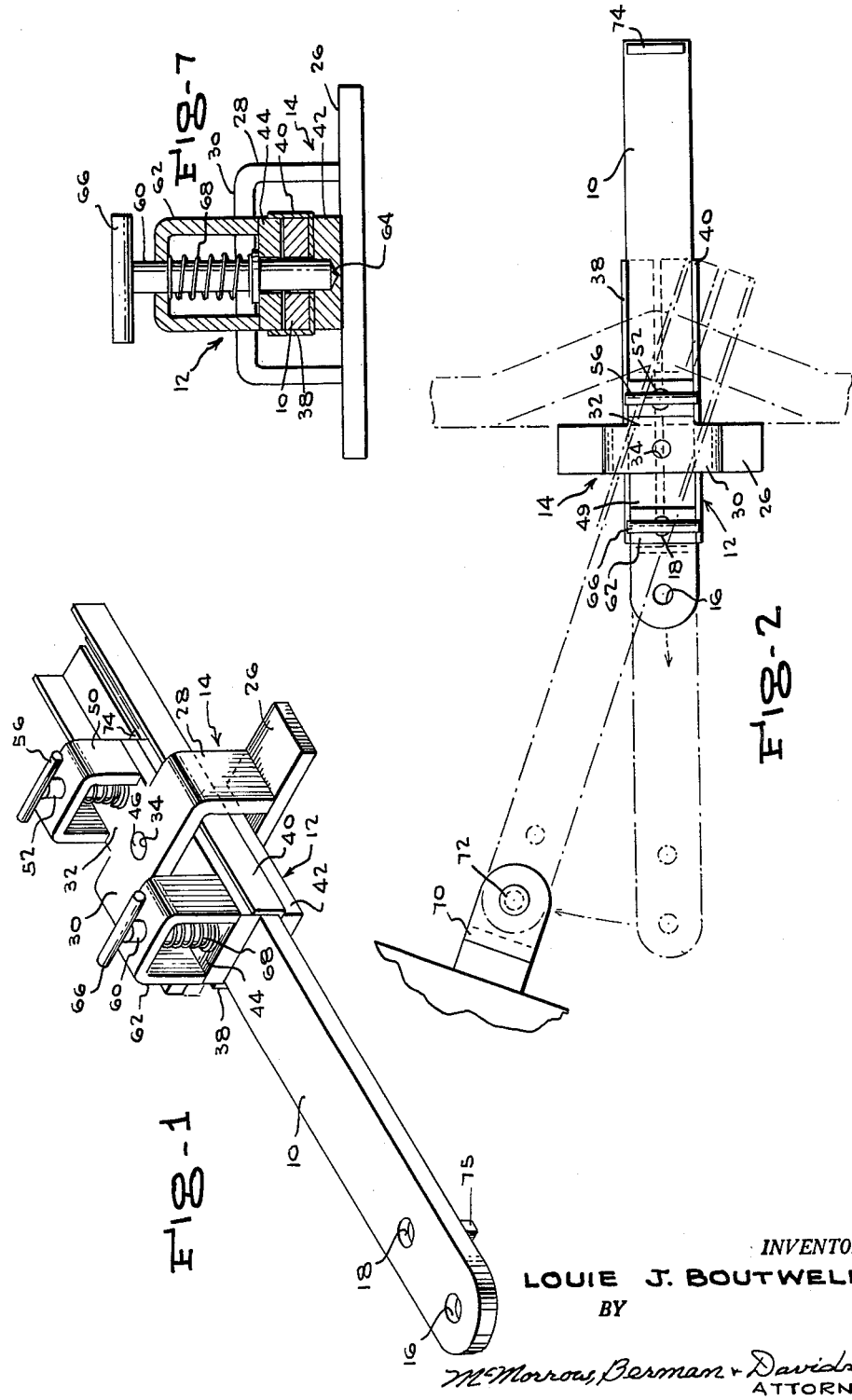

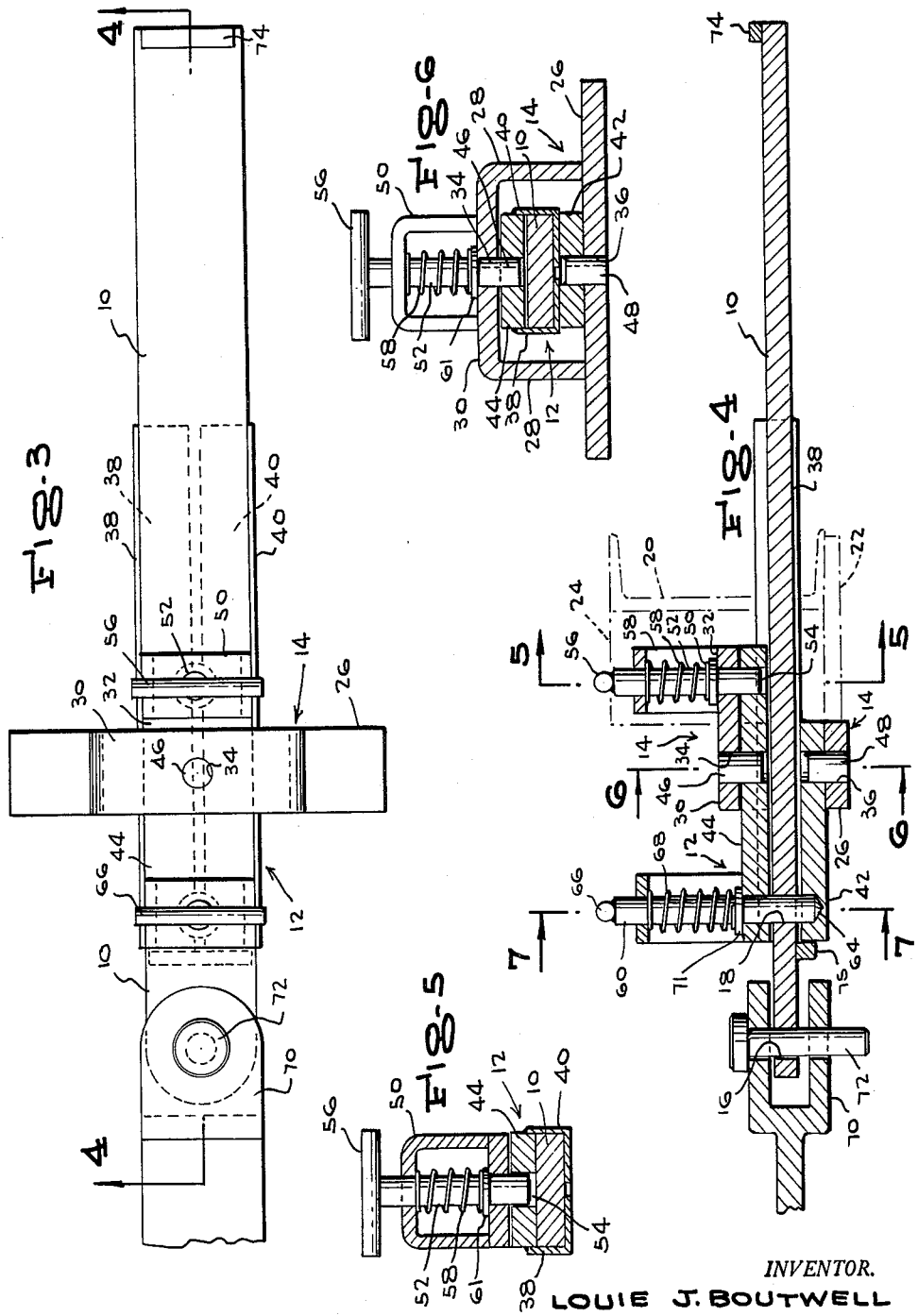

3,093,395
HITCH
Louie J. Boutwell, 2004 N. Moss St.,
North Little Rock, Ark.
Filed June 9, 1961, Ser. No. 116,198
3 Claims. (Cl. 280—478)

This invention relates to tow hitches for trailers and the like, and particularly to a device which facilitates the accomplishment of the pivotal connection.

Whether the pivotal connection is a simple pintle, or a ball-and-socket arrangement, or any other type, it has heretofore been necessary to maneuver the towing vehicle backwards and forwards until the pivot parts are brought into position on a common turning axis, and almost invariably this has required the cooperative efforts of at least two persons.

It is therefore an object of the invention to minimize maneuvering in the process of connecting tow hitches. A further and related object is to eliminate the need for assistance in connecting hitches. Other objects include the accomplishment of the foregoing in a hitch which is simple, easy of manufacture, low in cost, and which is easily installed, and adapted universally to existing vehicles.

These and other objects, which will be apparent to those skilled in the art, are attained by the present invention, which may be briefly described as comprising a tow bar, mounted for both swinging and sliding movement in a saddle fixed to the towing vehicle, whereby the pivot axis of the applied tow bar load may be reached from any of a plurality of positions of the tow vehicle, within a relatively wide range, and lock means rendering the sliding and swinging inoperable after the coupling has been effected.

For a more detailed description of the invention, reference is made to the following specification, as illustrated in the drawings, in which:

FIGURE 1 is a perspective view of the tow hitch, apart from a vehicle, and with the slide bar in extending position, FIGURE 2 is a top plan view of the hitch of FIGURE 1, somewhat reduced in scale, and with the slide bar retracted, showing in broken lines, the sliding, and swinging adjustment of the tow bar, and the coupling with the trailer, FIGURE 3 is a view similar to FIGURE 2, to enlarged scale, showing the connection with the trailer, FIGURE 4 is a sectional view taken on the line 4—4 of FIGURE 3, and FIGURES 5, 6, and 7 are sectional views taken on the lines 5—5, 6—6, and 7—7, respectively, in FIGURE 4.

Referring to the drawings by characters of reference, there is shown, in FIGURE 1, a tow bar tongue 10, which is mounted for sliding movement in the rectangular, central opening through a housing, indicated as a whole by the numeral 12, which in turn is mounted on a pair of vertical trunnions for swinging movement within a yoke, indicated as a whole by the numeral 14. The effective length of the coupling tongue 10, during towing, is the distance between centers of a pair of bores 16, 18, providing the connection with the trailer and the vehicle, respectively, which will be described in detail hereinafter.

The yoke 14 is the rigid component of the hitch system, and is welded or bolted to a suitable part of the tow vehicle, such as the frame channel 20 with the base plate 22 and side plates 24, all indicated in broken lines. As best seen in FIGURE 1, the fixed yoke comprises a base strap 26, mounting an inverted channel bracket 28, the upper, crosswise portion 30 of which has a forwardly extending tongue 32, which serves to carry one of the locking means, as will be seen. Upper and lower parts 30 and 26 of the fixed yoke, have central, axially aligned bores 34, 36 which serve as the mountings for the vertical trunnions on the slide tongue housing 12. The latter comprises a pair of angle bars 38, 40, with bottom flanges supported on a short length 42 of flat stock, to which they are welded, and with vertical flanges welded to the outer, side edges of a somewhat longer piece of flat stock 44. Plates 42 and 44 have axially aligned bores in which are secured a pair of pins 46, 48, which are rotatably mounted in bores 34, 36, of the yoke to provide the trunnion mounting. It will thus be seen that in the absence of any locking means, the slide tongue housing 12 may be swung in either direction on the trunnion axis, within the limits between contact with the respective end sections of yoke member 28. In order to lock the housing 12 in towing position, with its axis perpendicular to the long dimension of the yoke 14, the extension 32 of the yoke carries a short channel section bracket 50, and the extension and the bracket have aligned bores, slidably mounting a pin 52, which is also engageable in a bore 54 in upper plate 44 of the slide tongue housing when the latter is perpendicular to the yoke. The pin 52 has an upper cross-piece 56 for hand engagement, and is biased to locking position by a compression spring 58 surrounding pin 52 within the bracket 50, and acting against a collar 61 on the pin. In order to unlock the slide tongue housing for swinging movement, it is merely necessary to lift the handle 56 until the pin is clear of bore 54. The swinging parts will be automatically locked when the housing 12 next reaches the perpendicular position with respect to the yoke, and thus, after coupling with the trailer, the parts will be automatically locked shortly after the towing commences, when the vehicle and trailer become aligned.

For locking the tongue against sliding, a pin 60 is carried by the housing 12, being slidably mounted in aligned bores, respectively, in the upper housing plate 44 and in a channel bracket 62, secured to the top thereof, and the pin also being engageable in a blind bore 64 in the bottom plate 42 of the housing after passing through the bore 18 in the tongue 10, as shown in FIGURE 4. Similarly to pin 52, pin 60 has a handle 66, and is provided with a spring 68 engaging a collar 71 on the pin. FIGURE 4 also shows the tongue 10 coupled to the forked hitch element 70 of a trailer by a pintle 72, passing through aligned bores in the said element, and through bore 16 of the tongue 10.

During towing, as well as during periods of non-use, the tongue 10 is slid into the housing and locked against sliding and swinging, as indicated in FIGURE 4, for the case of towing, and FIGURE 2, in solid lines, for the case of non-use. Asuming the case where a coupling operation is to take place, the driver of the vehicle will back up, spotting his tow hitch, in a rough approximation, in the general vicinity of the trailer connection. In the usual case, this spotting will give a result as indicated in FIGURE 2, where it will be observed that the connector fork 70 is not only spaced from the towing tongue, but is out of longitudinal alignment therewith. However, according to the invention, these two discrepancies are easily compensated by the built-in features of the hitch. Therefore, after the rough spotting of the hitch, the driver may leave the vehicle, and finish the job of coupling by hand manipulation at the rear. This involves a lift on the forward pin 52 by a pull on handle 56, which enables tongue 10 to be slid to various positions to the rearward, up to a limit defined by a stop bar 74, carried at the front end of tongue 10. Forward motion of the tongue is limited by a stop bar 75, rearwardly on the tongue. Once bore 54 has been freed of pin 52, the sliding adjustment may be continued without the need for any sustained lift on handle 56. The sliding adjustment is indicated, in FIGURE 2, in broken lines, and the tongue is set, in this second approximation at about the required length to reach the trailer coupler. Next, the hitch is conditioned for angular adjustment by a pull on rearward handle 66, sufficient to lift pin 60 clear of tongue 10, so that the housing 12 of the latter may be swung on its trunnion mounting. Since swing in only one direction is necessary, the handle 66 may be released after commencement of the swing, thus freeing both hands for final, easy, adjustment of the tongue, by sliding and swinging, as required, to bring the bore 16 into axial alignment with the bores in the tow fork 70 of the trailer, after which the pintle 72 is deposited.

For towing, the parts must be locked in position, as shown in FIGURE 4, and this is effected by simple maneuvering of the towing car which causes reverse action of sliding and swinging, and automatic locking of the parts in operating position. Thus, a forward movement of the vehicle along a straight line will quickly align the hitch with the longitudinal axis of the vehicle, and the locking pin 52 will snap into place, preventing any further swing of the tongue and its slide housing. After this, the vehicle is backed up slightly, until the pin 60 snaps into bore 18 of the tongue, which completes the coupling operation.

While a certain, preferred embodiment has been shown and described, modifications will be apparent to those skilled in the art, in the light of this disclosure, and the invention should not, therefore, be deemed as limited, except insofar as shall appear from the spirit and scope of the appended claims.

I claim:

1. A tow hitch comprising a slide housing having a longitudinal passage of rectangular cross-section, a tow bar slidably mounted in said passage, and having a pair of bores, in tandem, near one end, and having stop means on opposite sides of said housing, for limiting sliding motion, a loop-form bracket adapted for fixed mounting on a vehicle, a pair of trunnions carried by said housing, and journalled on a vertical axis in said bracket, a spring-pressed, manually operable, lock pin slidably mounted in said bracket, in spaced relation to said trunnion axis, and said housing having a recess engageable by said pin, and a spring-pressed, manually operable, lock pin, slidably mounted in said housing, in spaced relation to said trunnion axis, and engageable in one of the bores in said tow bar, said pins being located on opposite sides of said axis.

2. A tow hitch comprising:
   (a) a slide housing having an upper plate, a lower plate, and side plates defining a through passage of rectangular cross section;
   (b) a tow bar slidably mounted in said passage, and having a pair of bores near one end, in longitudinally spaced relation, and having stop means on opposite sides of said housing, for limiting sliding motion;
   (c) a yoke adapted for fixed mounting on a vehicle, and having a base plate, a top plate and side walls, defining an aperture having a width in excess of that of said housing;
   (d) a pair of trunnions carried by said housing, and journaled in said base plate, and said top plate, respectively;
   (e) the upper plate of said housing having a bore in spaced relation to the trunnion axis;
   (f) a bracket carried by said top plate;
   (g) a spring pressed, manually operable lock pin, slidably mounted in said bracket and engageable in the bore in said housing when said tow bar is disposed in a medial position of swing within the limits of said yoke;
   (h) said housing having a pair of axially aligned bores in its upper and lower plate, respectively, on the side opposite the trunnion axis from said first named lock pin; and
   (i) a bracket carried by said upper plate, and carrying a spring pressed, manually operable, lock pin aligned with said last-named pair of bores in said housing and engageable with one of the bores in said tow bar.

3. A tow hitch comprising:
   (a) a slide housing having a longitudinal passage of rectangular cross sections;
   (b) a tow bar slidably mounted in said passage, and having a pair of bores near one end, in longitudinally spaced relation, and having stop means on opposite sides of said housing, for limiting sliding motion;
   (c) a yoke adapted for fixed mounting on a vehicle, and having a base plate, a top plate, and side walls, defining an aperture having a width in excess of that of said housing;
   (d) a pair of trunnions carried by said housing, and journaled in said base plate, and said top plate, respectively;
   (e) said housing having a bore in spaced relation to the trunnion axis;
   (f) a bracket carried by said yoke;
   (g) a spring-pressed, manually operable lock pin, slidably mounted in said bracket and engageable in the bore in said housing when said housing is disposed in a medial position of swing within the limits of its yoke;
   (h) said housing having a pair of axially aligned bores on the side opposite the trunnion axis from said lock pin; and
   (i) a bracket carried by said housing and carrying a spring-pressed, manually operable lock pin, aligned with said pair of bores and engageable with one of said bores in said tow bar.

References Cited in the file of this patent

UNITED STATES PATENTS

| | | |
|---|---|---|
| 2,446,223 | Forney | Aug. 3, 1948 |
| 2,582,595 | Leveke | Jan. 15, 1952 |
| 2,665,144 | Birdwell | Jan. 5, 1954 |
| 2,988,383 | Carson | June 13, 1961 |